June 17, 1947.  W. KOPEC  2,422,305
METHOD OF PROGRESSIVELY WELDING AXIALLY MOVING TUBING
Filed Oct. 24, 1942
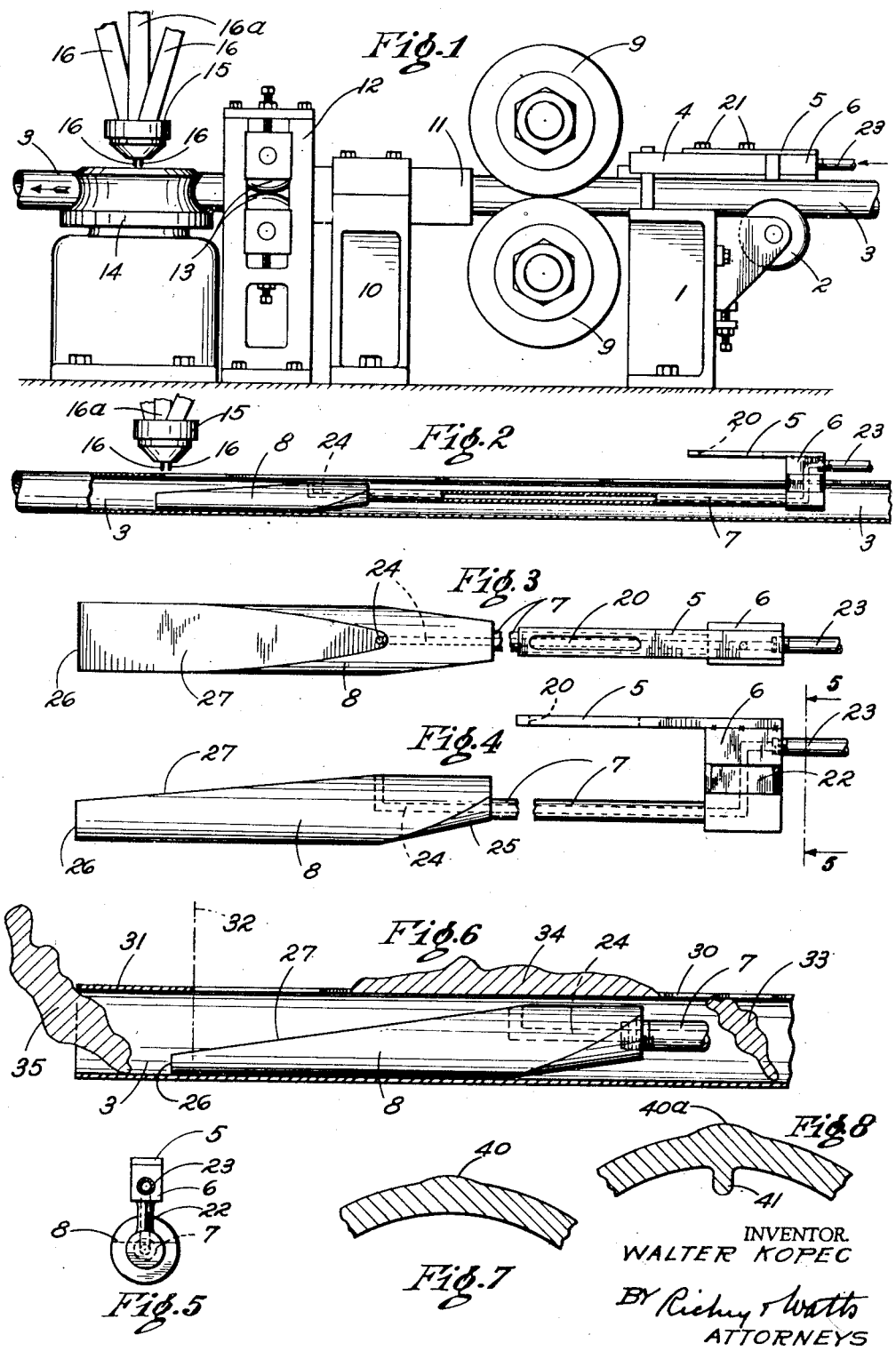
INVENTOR.
WALTER KOPEC
BY Richey & Watts
ATTORNEYS Patented June 17, 1947

2,422,305

UNITED STATES PATENT OFFICE 2,422,305

METHOD OF PROGRESSIVELY WELDING AXIALLY MOVING TUBING

Walter Kopec, Cleveland, Ohio, assignor to Republic Steel Corporation, Cleveland, Ohio, a corporation of New Jersey Application October 24, 1942, Serial No. 463,271

1 Claim. (Cl. 219—10)

1

This invention relates generally to the art of tube welding and is more particularly concerned with a new and improved method of atomic hydrogen welding of ferrous metal tubing.

For many years ferrous metal tubing has been electric resistance butt welded by passing a tube blank having longitudinally opposed edges endwise between rolls which gradually brought those edges into contact with each other and finally pressed them together with welding pressure where they were engaged by energized electrodes disposed on opposite sides of and closely adjacent to the edges.

Recently the atomic hydrogen welding method has come into use for certain types or grades of tubing. That method uses an electric arc and a blanket of hydrogen to accomplish the heating necessary for welding. An arc is drawn between two tungsten electrodes near the seam. Hydrogen discharged in the vicinity of the arc is changed from the diatomic to the monatomic condition by the arc. As it moves outside the influence of the arc, the hydrogen atoms recombine, releasing heat. The combination of the heat of the arc and the heat released by the hydrogen is sufficient for welding. Excess hydrogen blankets the weld and prevents oxidation.

The present method relates to improvements in this atomic hydrogen welding method.

Briefly stated, the present new and improved method includes the steps of providing and maintaining a quantity of hydrogen in contact with the inner surface of the tubing adjacent the edges for a short distance back from the place of welding and in preventing such hydrogen from circulating or swirling circumferentially of the tubing or inducing the flow of air into said space. In other words, a body of hydrogen is maintained within the tube for a short distance in front of the point where welding takes place and some of this hydrogen escapes between the edges of the tubing blank and much of the hydrogen passes in a more or less straight line flow into the already welded tube while air is substantially excluded from the welding zone.

The present new and improved method may be practised by apparatus which may be briefly described as including a mandrel, means for positioning it properly with respect to the parts of an atomic hydrogen welding apparatus and means for conducting hydrogen thru the mandrel and into a space defined by the mandrel and its encircling tube. The mandrel may be described as being a partly mutilated cylinder, the unmutilated part having a diameter only

2 slightly less than that of the tubing within which it is to be used, and the upper part of the cylinder being mutilated by being cut away to form a flat surface extending from an intermediate point on the cylinder to the trailing end thereof. The said mandrel is solid except for a small passage leading from the leading end thereof to an outlet thru the flat top surface of the mandrel.

In the drawings forming a part of this specification,

Figure 1 shows somewhat diagrammatically the side of atomic welding apparatus embodying the present invention;

Figure 2 shows the present invention as applied to the apparatus of Fig. 1, certain parts of the latter being omitted;

Figures 3 and 4 are respectively top plan and side elevational views of the preferred form of mandrel and mandrel mounting means shown in Fig. 2;

Figure 5 is an end view taken on line 5—5 of Fig. 4;

Fig. 6 is an enlarged fragmentary, longitudinal, sectional view taken thru the mandrel and tubing in the vicinity of the arc welding head of an atomic hydrogen welder equipped and operated according to the present invention;

Figure 7 is a fragmentary cross-sectional view taken thru tubing welded by means of the present method and apparatus; and Figure 8 is a fragmentary cross-sectional view taken thru tubing welded by means of the prior atomic hydrogen welding apparatus and apparatus.

In Fig. 1 the atomic hydrogen welding apparatus consists of a roll stand 1 carrying a guide roll 2 for supporting tubing blank 3, and also carrying a plate 4 to which is adjustably secured a bracket 5 attached to member 6 which extends between the longitudinal edges of tubing 3 and serves as an anchor for the mandrel rod 7 which is inside the tubing and which has mandrel 8 attached to the free end thereof. (See Figs. 2, 3 and 4.)

Feed rolls 9 mounted on stand 1 move the tubing blank 3 forwardly thru the remainder of the machine. Stand 10 carries a seam guide 11 which projects between the opposed edges of the tubing and serves to keep those edges in predetermined position. Stand 12 is located just beyond stand 11 and mounts two rolls 13 which serve to guide the tube blank and press the opposed edges thereof toward each other. Immediately beyond stand 12 is disposed a stand which carries two vertical axis rolls 14 which are adjustable to press the opposed edges into contact with each other with sufficient force to weld the edges together when they are suitably heated by the welding means disposed thereabove. This welding means consists of what might be called a welding head 15. This head carries a pair of electrodes 16 which project more or less vertically down toward and in a controlled relationship with the edges of the tubing. These electrodes are connected to a suitable source of power (not shown) which creates an arc between the electrodes and sends a suitable current through the arc. Hydrogen under pressure is discharged through tube 16 A and envelops the arc. Hydrogen is normally diatomic, but the arc breaks it down into the monatomic form. As it leaves the arc it recombines into the diatomic or molecular form and releases energy in the form of heat. This happens in the vicinity of the seam and the combination of the heat from the hydrogen and from the arc melts the seam edges sufficiently for welding. Excess hydrogen serves as a blanket around the outside of the tube at the welding area.

In Fig. 2 many of the parts shown in Fig. 1 have been omitted to show the disposition of the mandrel in the tube and the relative locations of the mandrel and the atomic hydrogen welding head 15. In this figure the bracket 5 is shown as being a flat piece of metal having an elongated opening 20 thru which cap screws 21 (Fig. 1) extends. Adjustment of the bracket lengthwise of the machine is possible by loosening the cap screws and shifting the bracket fore or aft on plate 4. At its free end bracket 5 carries member 6 which is cut away on opposite sides, as at 22, to accommodate the opposed edges of the tube blank and is provided with communicating passages which lead therethru from an inlet 23 (Fig. 1) to a passage in rod 7 which opens into a passage 24 in the mandrel 8. It will be understood from this description that when a source of gas, such as hydrogen under pressure, is connected to passage 23, it will be conducted to and discharged thru passage 24 in mandrel 8. It will be noted from Fig. 2 that the outlet end of passage 24 in mandrel 8 is a short distance in advance of the center line of the welding head 15.

In Figs. 3, 4 and 5 the details of mandrel 8 are shown more clearly than in Figs. 1 and 2. Mandrel 8 is an elongated body which is substantially cylindrical in the vicinity just in advance of the outlet of passage 24 and there its diameter is slightly less than the inside diameter of the tube within which it is to be used. The leading end of the mandrel is cut away or inclined to provide a curved inclined surface 25, so that the leading end of a tubing blank may engage therewith and lift the mandrel up toward the edges to be welded. The mandrel rides on the inner lower surface of the tube after the leading end of the latter has moved beyond the mandrel. Between the cylindrical portion and the trailing end 26 the top surface 27 of the mandrel is flat and inclined downwardly toward the trailing end.

When gas is discharged thru passage 24 into the interior of a tubing blank the cylindrical part of the mandrel 8 serves to prevent the escape of any considerable amount of such gas into the tubing in advance of the mandrel, while the top surface 27 tends to prevent swirling or circumferential circulation of the gas within the tubing and to direct it lengthwise of the tubing in more or less straight lines, and the surface 27, due to its inclination, tends to keep the expanding gas in contact with the edge portions of the tubing from the time it is discharged from passage 24 until it moves beyond the trailing end 26 of the mandrel while compensating for the expansion of the gas in such space due to the heating of the tubing by the welding heat.

In Fig. 6 the tubing 3 is shown with an open seam at 30 and a welded seam at 31. The center line of the welded head is shown at 32 and the position of mandrel 8 relative thereto is also indicated. This figure shows the flames produced by the burning of hydrogen which was delivered thru passage 24 into the space between mandrel 8 and tubing 3. At 33 is shown the burning of hydrogen which has escaped from the said space into the tubing in advance of the mandrel. At 34 is indicated the burning of hydrogen which has escaped from said space between the edges of the tubing, while at 35 is shown the burning of hydrogen which passed out of said space and thru the end of the welded part of the tubing. While Fig. 6 shows the end 26 of the mandrel 8 disposed slightly beyond the center line of the welding head, it will be understood that this end may be substantially on that center line or may extend beyond it. In other words, the exact positioning of the end 26 of the mandrel 8 is not extremely critical. This figure also shows that the distance from the outlet of passage 24 in mandrel 8 to the center line 32 of the welding head is approximately four times the outside diameter of the tube, which diameter in this instance is two inches. This relationship appears to be important but not critical.

From what has already been stated, it will be understood by those skilled in the art that when the parts described are assembled in the position shown in Figs. 1, 2 and 5 and the tubing is being moved thru the machine by rolls 9 and a hydrogen blanketed arc is maintained between the electrodes 16 hydrogen is passed thru the mandrel rod and mandrel and is released into the space between the mandrel 8 and the edge portions of the tubing. Such hydrogen escapes to a small extent into the tubing in advance of the mandrel where it burns, as is indicated at 33 in Fig. 6. Some of it escapes thru the space between the edges of the tubing blank and burns as is indicated at 34 in Fig. 6, while the remainder tends to flow lengthwise of the tubing in more or less straight lines with little or no tendency to swirl or circulate transversely of the tube. The hydrogen in said space is initially forced up against the edge portions of the tube by surface 27 of the mandrel and this action continues as the hydrogen is expanded by the welding heat and finally escapes into the welded tube where it may burn as is shown at 35 in Fig. 6.

It is important that the outlet end of passage 24 should be of the proper size for otherwise the beneficial results of this invention may not be fully realized. I believe that the size of this outlet should vary with the diameter of the tubing, the thickness of the tubing wall, the distance between the outlet and the point of welding, and the pressure under which the hydrogen is delivered into the passage 24. The relative sizes of the flames 33, 34 and 35 of Fig. 6 afford a good indication of a suitable adjustment of these several factors. I have obtained the exceptionally good results indicated in Fig. 7 when a tubing blank composed of stainless steel two inches in diameter and 19 to 20 gage in wall thickness was welded at a speed of about six and one-half feet per minute. Under those conditions the outlet from passage 24 was $\frac{3}{32}$ inch in diameter, the pressure on the hydrogen in the mandrel ranged between 0.5 and 1.0 pound per square inch, and the hydrogen consumption was calculated to be at the rate of about 15.1 pounds per hour. The steel above identified had a composition of approximately

| | Per cent |
|---|---|
| Carbon | .10 |
| Manganese | 1.50 |
| Chromium | 18.00 |
| Nickel | 8.00 |
| Columbium | .70 | and small amounts of the ordinary impurities such as sulfur and phosphorous, the remainder being iron.

Figures 7 and 8 are similar and comparable views of atomic hydrogen welds made from the same kind of steel with and without the use of the present invention respectively. It will be noted that in Fig. 7 there is substantially no welding flash on the inner surface of the tubing and that the flash 40 on the outside surface is very small. In contrast therewith, Fig. 8 shows considerable welded flash 41 on the inside of the tubing and slightly more flash 40a on the outside of the tubing.

I do not know the reasons why the present invention produces the new and unexpected results depicted in Fig. 7. A number of theories have been suggested as a possible explanation. One such theory is that the electric field in the vicinity of the arc acts on the hydrogen within the tubing, breaking it down into monatomic hydrogen, which later combines to form diatomic (molecular) hydrogen with the liberation of heat, and that such heat assists in raising the temperature of the inside wall of the tube so that welding takes place thruout the full radial length of the opposed edges with the application of less heat to the exterior of the tubing and with the resultant formation of the weld without heating the seam edges to such an extent that the metal thereof will flow into the interior of the tube and form fins. This theory seems to be supported by the fact that when this invention is employed the welding can be accomplished with the application of less heat and pressure to the outside of the tubing than when this invention is not employed. Another theory is that the burning of the hydrogen in contact with the edges of the tubing tends to preheat those edges. A further theory is that the surface tension of molten stainless steel may be much greater in an atmosphere of hydrogen and in the absence of scale than it is when air is present and conditions are suitable for the formation of oxides. If in fact the surface tension is higher under such conditions, it is possible that there would be less tendency for the formation of inside burrs. Then, too, it has been suggested that the fact that the thermal conductivity of hydrogen is some seven times greater than that of air may be a factor of considerable importance.

However, regardless of what the correct theory is, the facts are that by means of the present invention and the above described method and apparatus I have obtained the new and unexpected results herein shown and above described.

Having thus described my inventions so that others skilled in the art may be able to understand and practice the same, I state that what I desire to secure by Letter Patent is defined in what is claimed.

What is claimed is:

In an electric process of progressively welding together the longitudinal edges of an axial moving tube blank, the steps of positioning in the blank a short distance in advance of the point of welding an obstruction which substantially completely fills the blank, delivering sufficient hydrogen gas under pressure into the blank between the obstruction and point of welding to result in flow of the gas out of the blank between the unwelded edges between said obstruction and said point of welding and also lengthwise of the blank, and directing the lengthwise flow of the gas in the blank in the direction of travel of the blank and along lines generally parallel to the axis of the blank.

WALTER KOPEC.

REFERENCES CITED

The following references are of record in the file of this patent:

UNITED STATES PATENTS

| Number | Name | Date |
|---|---|---|
| 2,092,003 | Mitchell | Sept. 7, 1937 |
| 2,179,176 | Dunn | Nov. 7, 1939 |
| 1,810,112 | Riemenschneider | June 16, 1931 |
| 1,604,736 | DeForeest | Oct. 26, 1926 |
| 2,254,792 | Brown | Sept. 2, 1941 |
| 2,091,307 | Catlett et al. | Aug. 31, 1937 |
| 2,009,476 | Church et al. | July 30, 1935 |
| 2,176,237 | Anderson | Oct. 17, 1939 |
| 2,182,796 | Deming | Dec. 12, 1939 |
| 2,196,192 | Broadfield | Apr. 9, 1940 |